United States Patent Office 2,894,809
Patented July 14, 1959

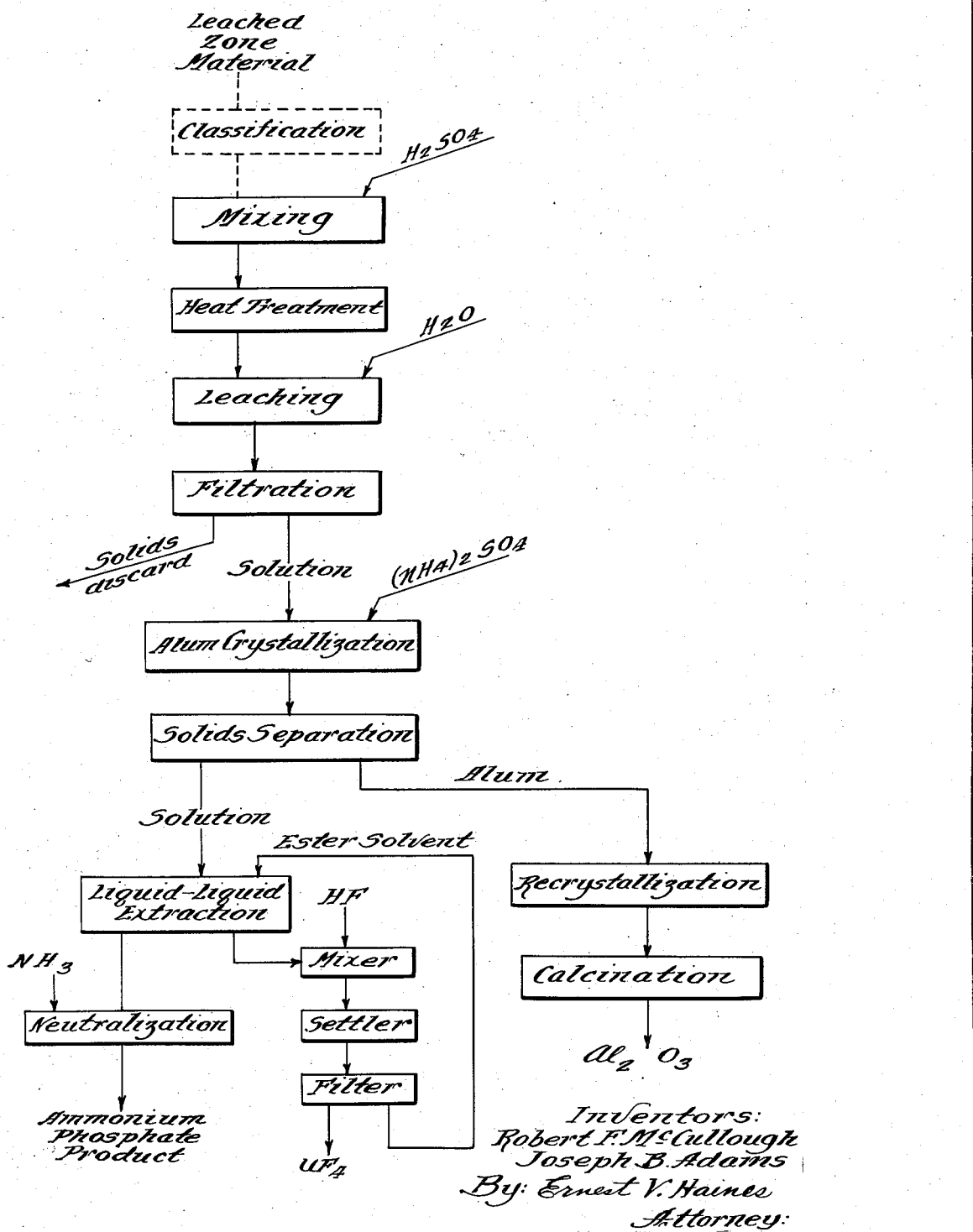

2,894,809

METHOD OF RECOVERING MINERAL VALUES

Robert F. McCullough, Glenview, Ill., and Joseph B. Adams, Lakeland, Fla., assignors, by mesne assignments, to the United States of America as represented by the United States Atomic Energy Commission Application July 6, 1955, Serial No. 520,376

13 Claims. (Cl. 23—14.5)

This invention relates to the recovery of mineral values from low grade phosphate-bearing ores. More particularly, it relates to the recovery of phosphorus, aluminum and uranium values from leached zone material from the Florida pebble phosphate fields.

Processes for the recovery of $P_2O_5$ values from phosphate-bearing ores currently in commercial use generally involve conversion of phosphates to water soluble forms by reaction of the ore with sulfuric acid either in a wet slurry system or a system involving the formation of an acid-mix which sets to relatively dry solid form and leaching the dry solids to recover the water soluble reaction products. The solution or extract is generally treated with lime or other reactants to recover phosphate salts or reacted with, for example, phosphate rock to form products such as triple superphosphate.

These processes all have two disadvantages in common. The processes all require a relatively large amount of acid in excess of the stoichiometric requirements for reaction to effectually solubilize all the mineral components. In addition, the slurry mixtures formed during processing present difficult filtration problems.

In those processes where recovery of minerals other than phosphorus from the low grade ore was attempted, the processes have shown the tendency, namely, that when conditions were set for high recovery of one component only, recovery of other components followed to about the same degree. In other words if 90% uranium recovery was desired, sufficient acid must be added to solubilize about 90% of the phosphorus and other reactable values.

It is a primary object of this invention to overcome the shortcomings and disadvantages of the processes heretofore in use.

It is an object of this invention to provide a method for recovery of mineral values from low grade ores as represented by leached zone material, kaolinite ore and the like.

It is another object of this invention to provide a method for relatively high recovery of all constituents convertible to water soluble reaction products by reaction with sulfuric acid.

It is a further object of this invention to provide a method for improved solubilizing of uranium constituents of low grade phosphate ores per unit of reagent used while depressing the reactivity of the phosphorus and aluminum values.

It is still another object of this invention to provide a method for recovery of constituents of low grade ore wherein the acid mix is heat treated thereby improving the filtering characteristics of the slurries.

These and other objects of the invention will be apparent to those skilled in the art from the following description.

Briefly, the instant invention comprises acidulating the low grade phosphate-bearing ore with sulfuric acid under conditions of strong agitation, heat treating the acid-mix at temperatures in the range between about 200° C. and about 700° C., leaching the water soluble reaction products from the heat treated mix and processing the leached solution to recover at least one of the phosphorus, aluminum, uranium or other constituents.

More in detail, the following discussion is made relative to leached zone material as a representative low grade phosphate-bearing ore. In the process of the present invention leached zone material, which is a clay-like material found in a layer between the economic phosphate matrix and the silty-sand overburden in the Florida pebble phosphate fields, consisting predominantly of wavellite or pseudowavellite, together with quartz, sand, kaolinite and fluorapatite, is transported from the mine to the processing plant either by dry or wet transportation systems. If transported dry, the leached zone material is further dried, agglomerates disintegrated and then sized by mechanical or air classification means to produce a fraction of particles smaller than between about 150 mesh and about 220 mesh standard screen size, depending upon the classification procedure in the ore dressing section of the plant. If the mined material is moved hydraulically the material is subjected to wet classification and the undersized fraction subjected to a thickening and filtering operation to produce a high solids content slurry of the order of about 30% to about 65% solids by weight. The solids of this slurry are preferably given a preliminary drying step to reduce the moisture content thereof.

The dry solids whose small particle size fraction is the more valuable portion of the leached zone material because it contains roughly 70% or better of the valuable minerals, will vary considerably in composition depending upon the area in which the ore is mined. Therefore, the following description is given with reference to a leached zone material of which the following would be a representative assay obtained by averaging about 200 samples.

| Mineral Value | Plus 200 Mesh | Minus 200 Mesh |
|---|---|---|
| $P_2O_5$ | 5.44 | 14.68 |
| $Al_2O_3$ | 1.68 | 25.34 |
| CaO | 5.53 | 9.19 |
| $Fe_2O_3$ | 1.60 | 3.11 |
| $U_3O_8$ | 0.0053 | 0.03 |
| Acid Insoluble | 83.08 | 38.56 |

For any one particular sample, the percentages of various minerals are subject to considerable variation. For example, $Al_2O_3$ will vary from about 11% to about 35% in the minus 200 mesh fraction. With this variation of one component there may be direct, inverse or random variation of the other components such as $P_2O_5$ and $U_3O_8$.

Leached zone material may be treated directly without any sizing operation, with sulfuric acid, but in processing leached zone material acidifying a minus 200 mesh fraction is preferred.

This normally dry minus 200 mesh fraction is intimately mixed with sulfuric acid in heavy duty mixing equipment such as a pug mill. Sulfuric acid is added to the mixer in the form of concentrated acid of between about 70% and 98% sulfuric acid. This concentrated acid is added in amounts giving a degree of acidulation which can be varied depending upon the temperature level of heat treatment to follow chemical and/or mineral composition of the feed and the length of time of said heat treatment. Generally, sufficient acid is added to give between about 10% and about 90% acidulation, the exact range depending upon the subsequent processing operations in handling of the leach liquors. If it is desired to have high uranium dissolution and relatively low phosphorous and aluminum dissolution the preferred percent acidulation would be between about 20% and about 50% while if relatively high recoveries of all components was desired the preferred percent acidulation would be between about 60% and about 90%. Table I which follows illustrates the effect of percent acidulation on a minus 200 mesh leached zone feed analyzing 30.4% $Al_2O_3$, 16.8% $P_2O_5$ and 0.026% $U_3O_8$. This ore required 1.04 pounds sulfuric acid per pound feed for 100% acidulation. This ore was mixed with sulfuric acid, heated three hours at 300° C., cooled and leached with water.

TABLE I

| Percent Acidulation | Percent Solubilization for Percent Acidulation and Component Indicated | | |
|---|---|---|---|
| | Uranium | Phosphorus | Aluminum |
| 10 | 20 | 10 | 14 |
| 20 | 52 | 20 | 26 |
| 30 | 73 | 30 | 40 |
| 40 | 84 | 40 | 52 |
| 50 | 91 | 51 | 63 |
| 60 | 90 | 61 | 70 |
| 75 | 86 | 79 | 81 |
| 90 | 82 | 92 | 92 |

Variation in recovery of mineral values from different source materials was determined by mixing the required amount of sulfuric acid to give 40% acidulation with each of eleven ore samples, heat treating the mix for about three hours at 300° C., and leaching the cooled, heat treated mixes with water. Results are shown in Table II.

TABLE II

| Feed | Percent $U_3O_8$ in ore | Lbs. $H_2SO_4$ per lb. ore | Percent Dissolution | | |
|---|---|---|---|---|---|
| | | | $U_3O_8$ | $P_2O_5$ | $Al_2O_3$ |
| 1 | 0.035 | 0.20 | 73 | 23 | 30 |
| 2 | 0.016 | 0.18 | 99 | 18 | 40 |
| 3 | 0.056 | 0.20 | 64 | 34 | 39 |
| 4 | 0.010 | 0.20 | 89 | 60 | 46 |
| 5 | 0.039 | 0.19 | 60 | 22 | 27 |
| 6 | 0.018 | 0.18 | 80 | 36 | 39 |
| 7 | 0.025 | 0.16 | 63 | 5 | 23 |
| 8 | 0.022 | 0.18 | 77 | 14 | 32 |
| 9 | 0.026 | 0.21 | 65 | 11 | 30 |
| 10 | 0.024 | 0.22 | 74 | 19 | 32 |
| 11 | 0.022 | 0.16 | 75 | 33 | 31 |

$U_3O_8$, $P_2O_5$ and $Al_2O_3$ recoveries in solution average 75%, 25% and 36%, respectively.

Percent acidulation referred to in this description is calculated on the basis of the reaction of sulfuric acid with all of the iron, aluminum, calcium, magnesium and sodium or other significant cationic constituents present in the leached zone material. In other words, 100% acidulation would be the addition of that amount of sulfuric acid required to completely react with these components.

The effect of increased temperatures, i.e., heat treating the ore at temperatures in the range of about 350° C. to about 725° C., for those degrees of acidulation which give relatively high recovery of uranium and low recovery of phosphate and alumina is to improve the recovery of uranium and lower the recoveries of phosphate and alumina. Temperatures cannot be raised indiscriminately, however, because above 600° C. some sulfur dioxide is freed showing evidence of decomposition of sulfates and above 750° C., decomposition is so advanced that little solubilizing of any constituent results from the ore treatment.

At 40% acidulation of various samples of leached zone material, uranium solubilizing shows a relatively constant high recovery between about 250° C. and about 700° C. with a slightly pronounced optimum generally appearing at temperatures in the range between about 450° C. and about 500° C. Over this temperature range of 250° C. to about 700° C., both phosphate and alumina recovery generally show a reduction with increase in temperature with the net result of higher recovery of uranium per unit of phosphorus and aluminum recovered. Composition of ores have a marked effect upon response to acidulation and heat treatment and it is to be understood that the above optimum range may not include the optimum point for each and every sample of various ores as, for example, of leached zone material or kaolinite.

Temperature of heat treatment and percent acidulation can be interrelated to accomplish shifts in the relative amounts of uranium, aluminum and phosphate recovered. At any heat treatment temperature in excess of 300° C., increase in percent acidulation to higher than about 50% lowers the recovery of uranium. The same effect of lower uranium recovery is attained by elevation of the heat treatment temperature above 300° C., while maintaining a constant percent acidulation. The above conditions of increasing temperature while maintaining any specific percent acidulation also decreases the recovery of $Al_2O_3$ and $P_2O_5$. On the other hand, for any specific heat treatment temperature, an increase in percent acidulation above 50% increased the recovery of $Al_2O_3$ and $P_2O_5$.

Time of heat treatment is generally for a period of between about one-fourth hour and above six hours and preferably treated within about three hours. This period of heat treatment may be varied considerably depending upon the other variables discussed above, namely, percent acidulation and temperature of heat treatment. Normally, however, a small increase in recovery is observed by increasing the heating treatment from about one to about three hours.

Slurry formed in the pug mill may be heat treated in suitable calcination equipment such as a hearth furnace or a rotary kiln where the solids move either co-current or countercurrent to the flow of drying gases. Drying may be accomplished by direct contact with combustion gases or by indirect methods such as drying with hot air heated by heat exchange with hot combustion gases or by direct application of heat to, for example, the rotary kiln.

Heat treated solids may be used directly in the process or stored until needed. Dry solids are crushed to produce a leaching operation feed having particles generally of less than about 8 mesh size. The ground solids are then mixed with water or a weak water extract from previous processing, and slurried therewith in order to take up in aqueous solution all of the water soluble values contained in the acidified heat treated leached zone material. This leaching operation is usually carried out in a multi-stage decantation or mixer filtering operation of two to four stages with the solids and water preferably moving countercurrently through the stages.

When violent agitation is used during the leaching operation, heavy striation of the roasted frit takes place and filtration rates are decreased by a factor of about 10 to 100.

A similar effect is obtained if the frit is finely ground before leaching. In neither case is the loss in filtration rate compensated by an increase in recovery of value. Mild agitation, therefore, is essential.

With mild mechanical treatment in the leaching step filtration and settling rates are adversely affected as roasting temperature is lowered. The character of the final frit varies markedly with temperature. At lower temperatures in the range of 100° C. to about 250° C., the roasted mass shows a lack of cohesion and disperses in water to release large amounts of fine material. Filtration rates for material heat treated in this low range are reduced by a factor of three or more. The change in the character of the roasted frit occurs at different temperature levels depending upon the percent acidulation. In general, however, at the acidulation level of between about 20% and about 40%, the adverse effect of temperature of treatment generally appears in the temperature range between about 200° C. and about 250° C.

Leached solution is adjusted to a specific gravity in the range of about 1.15 to about 1.35 with about 1.2 to about 1.3 preferred. This is accomplished by proper water addition during the leaching operation. With a final liquor specific gravity of 1.3 and a filtering temperature of 65° C., filter rates of about 10 to about 60 gallons of liquor per hour per square foot of filter area are obtained. This is comparable to a filter rate of about 1 to about 6 gallons of liquor per hour per square foot of filter area when the leached zone material is not calcined.

Filtration is carried out at temperatures as high as practical from an operational point of view. Generally, the temperature of the slurry is maintained at between about 30° C. and about 95° C., normally 65° C.

Solids-free leached solution when recovered following processing under conditions where comparatively high recoveries of all components and particularly alumina is obtained, is generally treated with ammonium compounds such as ammonium sulfate and/or ammonium acid sulfate to crystallize out ammonium alum.

Ammonium alum crystallization will vary in completeness of aluminum removal or in purity of product depending upon such variables as $Al_2O_3$ concentration, time and temperature of crystallization and ratio of $P_2O_5$, $NH_4$, $SO_4$, and Al ions.

Ammonium sulfate or ammonium bisulfate may be added to the solution obtained from leached zone for crystallization of ammonium alum. Normally ammonia and sulfur values are added in excess of that required for stoichiometric formation of ammonium alum.

When adding ammonium sulfate to give between about 1:1 and about 4:1 $NH_4$:Al mole ratios, the water content of the liquor has been found to be very important. Normally as the $NH_4$:Al ratio is increased, under a given set of operating conditions at about 25° C., the recovery of ammonium alum as crystal will increase. This difference in recovery is least apparent at about 60% water content. As the water concentration is increased to about 80%, i.e., 20% dissolved solids by weight, the alum recovery normally decreases. For example, when crystallizing at 30° C. from liquor having a 60% water concentration and a $P_2O_5$:$Al_2O_3$ mole ratio of about 0.6 in the solution, variation in ratios of $NH_4$ to Al, from 1:1 to 4:1 and when using ammonium sulfate, has little effect and alumina recovery is of the order of 70 to 74%. At 80% water concentration on the other hand, at an $NH_4$:Al ratio of 1, the recovery of alumina is reduced from about 70% to about 40%, the recovery of alumina increasing with an increase in ratio until at a ratio $NH_4$:Al of 4:1 the alumina recovery is only reduced from about 71% to about 65%. In general when ammonium bisulfate is substituted for ammonium sulfate, under the same crystallizing conditions, alum recoveries are higher at a given $NH_4$/Al ratio. At any water concentration up to 80%, the alum recoveries when using $NH_4$/Al ratios between about 2 and about 4 show little or no tendency toward reduction in alum recovery. When using ammonia bisulfate at 80% water concentration, and an $NH_4$/Al ratio of 4:1 under identical precipitation conditions as in the case of ammonium sulfate previously discussed, alumina recovery is of the order of 82%. When the sulfate ion in the precipitating liquor is increased above the $NH_4HSO_4$ addition stage, i.e., addition of equal molar quantities of $NH_4HSO_4$ and $H_2SO_4$ such that there is an excess of free sulfuric acid, alum recoveries decrease when $NH_4$/Al ratios are increased, particularly as the water content of the precipitating liquor is decreased from about 80% and about 60%. Under these conditions a $NH_4$/Al ratio of about 1:1 sometimes is satisfactory to give alum recoveries above 80%.

Under crystallizing conditions identical with those described above, as the $P_2O_5$/$Al_2O_3$ mole ratio increases there is a decrease in alum recovery. Solutions recovered from leached zone reaction with sulfuric acid give ratios between about 0.05 and about 1.0 normally between about 0.5 and about 0.7 $P_2O_5$/$Al_2O_3$ mole ratios. Generally a crystallization temperature between about 0° C. and about 35° C., preferably about 25° C., is used. Crystallization time after addition of the desired compound, i.e., ammonium bisulfate crystal, of less than six hours is used. Although longer times will give somewhat higher yields, the additional equipment required in general is not economically justified. Using combinations of the above variables alum yields between about 70% and about 97%, normally between about 80% and 85%, can be attained. Upon removal of the crude ammonium alum from the mother liquor by separation means such as filtration or centrifuging, the mother liquor then is processed for subsequent recoveries of uranium and phosphorus values. Since the ammonium alum may be processed for recovery of alumina, additional purification steps may be employed.

Suitability of alumina for use in the metallurgical aluminum is determined by $P_2O_5$, $Fe_2O_3$, $SiO_2$, and other impurities. It has been found that these impurities will be removed by recrystallization of ammonium alum.

Normally, two recrystallizations are required in order to remove the desired amounts of these impurities. However, one recrystallization has proven satisfactory in some cases. These recrystallizations normally are conducted in a continuous Oslo-Krystal crystallizer operating at about 35° C. where alum crystals of between about minus 14 mesh and about plus 60 mesh are produced.

If crude alum is recrystallized twice to reduce the $P_2O_5$, $Fe_2O_3$ and $SiO_2$ content of the alum, the reduction in quantity of impurities is shown from the following table.

|  | Crude Alum | Recrystallized Alum | Twice-Recrystallized Alum |
| --- | --- | --- | --- |
| $P_2O_5$, p.p.m. | 1,200–1,500 | 70–150 | 1–7 |
| $Fe_2O_3$, p.p.m. | 100–200 | 20–40 | 10–16 |
| $SiO_2$, p.p.m. | 100–200 | about 1 | about 1 |

Ammonium alum recovered from the recrystallizing operations is reacted with aqueous ammonia under conditions of very mild agitation and room temperature such that an alumina ($Al_2O_3 \cdot XH_2O$) is produced.

Aqueous ammonia is mixed with the crystalline ammonium alum generally such that about 100% excess, of that required to neutralize the sulfate component of aluminum sulfate, is added. Aqueous ammonia concentrations between about 10% and about 30%, preferably about 20%, is used. Upon addition of the reactants, the reaction slurry is generally agitated, i.e., by use of a slow revolving baffled rotary tube, for a period of up to about four hours. Substantially complete reaction occurs at 30 minutes. The resulting slurry is filtered and leached with about 150 pounds of water per 100 pounds of ammonium alum initially used. Under optimum reaction conditions, fast filtrations result. This pseudomorphous solid product, containing some ammonia and sulfate impurities, is heated to between about 900° C. and about 1150° C. to recover alumina. Alternatively, if metallurgical grade alumina is not desired, the crude ammonium alum may be thermally decomposed at about 900° C. to produce an alumina directly.

Partially purified liquor normally free of suspended solids is subjected to uranium recovery by use of solvent extraction as the preferred modification. This solution is preferably first subjected to a reduction reaction accomplished by electrolytic means or by chemical reaction wherein the solution is treated with metallic iron, etc., or other reducing agents. If the reducing agent is a solid, its removal is accomplished through the use of a filter, centrifuge, cyclone or other suitable separation devices. While reduction is preferred, solvent extraction may be employed upon solution in an unreduced as well as a partially reduced state. After removal of reducing agents, the reduced aqueous solution is intimately contacted or otherwise agitated with the organic solvent extractant.

This extractant is made up of two components, the extractant and the vehicle or extender. The extractant may be one or more of the ortho and/or the pyro phosphoric acid esters of the alkyl monohydric alcohols. Both the mono and diesters, as well as mixtures of the two are useful. Phosphoric acid esters of octyl or higher molecular weight alcohols are preferred since they are less water soluble. The extender may be any one or more of the common organic solvents such as kerosene, benzene, mineral spirits, carbon tetrachloride and the like. The concentration of extractant in the extender may vary widely, for example, between about 5% and about 95%, preferably between about 5% and about 10%. The volume ratios of aqueous solution to organic solvent may vary within wide limits, for example, between about 1:1 and about 40:1, preferably between about 3:1 and about 10:1.

The organic phase is treated with aqueous hydrofluoric acid or any other mixture capable of precipitating and/or removing uranium as, for example, in the form of $UF_4$.

The aqueous phase after extraction treatment is processed to recover the predominantly phosphorus, nitrogen and sulfur values which are in solution in any number of compounds such as ammonium sulfate, ammonium acid sulfate, metal phosphate, $P_2O_5$ values such as phosphoric acid or combined with various metal or cationic values as mentioned above.

Mother liquor separated from crude ammonium alum and processed for uranium recovery then is neutralized with ammonia for precipitation of insoluble phosphate compounds containing $Al_2O_3$, $Fe_2O_3$ and amonia values at a pH above about pH 3.2, preferably at pH about 4.5, and in a continuous system. Upon separation of the insoluble phosphate, where fast filtration rates are obtained if the neutralization at pH 4.5 has been done in a continuous autogenous system, the resulting mother liquor contains predominantly ammonium sulfate and monoammonium phosphate, exact ratio, concentration and quantities of each depending upon the prior processing employed. This solution is evaporated at boiling temperatures to a point where a rich fraction of predominantly ammonium sulfate exists in solid phase.

Upon separation, near boiling temperatures, of the ammonium sulfate from the liquor phase, the resulting liquor is cooled to about 25° C. and monoammonium phosphate, containing small amounts of ammonium sulfate impurities, removed from the liquor phase. This liquor phase then may be cycled for subsequent recovery of contained values. Monoammonium phosphate may be recrystallized using the same type of circuit and phase system if a higher purity product is desired.

Products such as ammonium aluminum sulfate, aluminum phosphate, iron phosphate and the like may be processed in a number of different ways, either to recover the products in a purified form or to convert the products to other forms such as aluminum, iron oxide and the like.

Alternatively, the aqueous phase with or without alum removal and uranium extraction may be treated with ammonia and dried directly to produce a fertilizer material containing ammonium sulfate, ammonium phosphates and metal phosphates. The figure illustrates the above described process by means of a flow diagram.

The invention will be further illustrated by the following examples:

*Example I*

Dry leached zone material was air sized to produce a 1000 pound fraction of material passing through a 200 mesh standard screen. This leached zone material, having the following chemical analysis:

| Component: | Percent by weight |
|---|---|
| $Al_2O_3$ | 30.4 |
| $P_2O_5$ | 16.8 |
| $U_3O_8$ | 0.026 |
| CaO | 0.5 |
| $Fe_2O_3$ | 1.6 |
| Acid insolubles ($SiO_2$, etc.) | 30.3 | was mixed with 96% sulfuric acid at a rate of about 53 pounds of acid per 100 pounds of dry solids and about 200 pounds of water added per 100 pounds of dry solids. This amount of acid constituted about 49% acidulation.

The solids and liquids were mixed in an attrition mixer at about 80° C. for 18 hours to obtain dissolution of components.

The slurry, after cooling, was leached with water at 65° C. for 30 minutes and filtered to recover solubilized constituents and the insoluble cake discarded. A filter rate of approximately six gallons of slurry per square foot of filter area per hour was attained. The resultant extract at approximately 1.3 specific gravity showed the following pounds of constituents recovered per 1000 pounds of minus 200 mesh leached zone feed.

| | |
|---|---|
| $P_2O_5$ | 108 |
| $Al_2O_3$ | 170 |
| $U_3O_8$ | 0.18 |

The mineral digest solution having a volume of about 230 gallons was subjected to contact with about 10 pounds of powdered metallic iron and agitated for about 30 minutes, after which the solids were filtered from the liquid. This liquid was then thoroughly contacted with about 23 gallons of an organic solvent composed of about 9 parts by volume of kerosene and 1 part by volume of a mixture of mono and diesters of orthophosphoric acid of iso-octyl alcohol. The contact was maintained for about 2 minutes in each of the four successive countercurrent stages. The organic solvent was separated from contact with the fresh aqueous phase and processed for recovery of about 0.27 pounds uranium fluoride cake (dry basis), containing 0.17 pounds $U_3O_8$, by contact with 15% HF solution. Fresh organic was contacted with the aqueous phase, after three contacts with partially loaded ($U_3O_8$) organic, and upon separation of the phases the aqueous phase was processed to recover values contained in the aqueous phase.

The resulting solution was adjusted to pH 7 with ammonium hydroxide (29%) and evaporated to dryness to recover a material suitable for agricultural consumption.

*Example II*

Dry leached zone material was air sized to produce a 1000 pound fraction of material passing through a 200 mesh standard screen. This leached zone material, having the following chemical analysis:

| Component: | Percent by weight |
|---|---|
| $Al_2O_3$ | 30.4 |
| $P_2O_5$ | 16.8 |
| $U_3O_8$ | 0.026 |
| CaO | 0.5 |
| $Fe_2O_3$ | 1.6 |
| Acid insolubles ($SiO_2$, etc.) | 30.3 | was mixed with 96% sulfuric acid at a rate of about 53 pounds of acid per 100 pounds of dry solids and about 20 pounds of water added per 100 pounds of dry solids, water being added to aid more complete mixing of solid and liquid materials. This amount of acid constituted about 49% acidulation.

The solids and liquids were mixed in a pug mill running at about 120 r.p.m. The heavy paste discharged from the pug mill was roasted at a temperature of approximately 300° C. for three hours.

The roasted material after cooling was leached with water at 65° C. for 30 minutes and filtered to recover solubilized constituents and the insoluble cake discarded. A filter rate of approximately 40 gallons of slurry per square foot of filter area per hour was attained. The resultant extract at approximately 1.3 specific gravity showed the following pounds of constituents recovered per 1000 pounds of minus 200 mesh leached zone feed.

| | |
|---|---|
| $P_2O_5$ | 87 |
| $Al_2O_3$ | 176 |
| $U_3O_8$ | 0.236 |

The mineral digest solution having a volume of about 200 gallons was subjected to contact with about 10 pounds of powdered metallic iron and agitated for about 30 minutes, after which the solids were filtered from the liquid. This liquid was then thoroughly contacted with about 20 gallons of an organic solvent composed of about nine parts by volume of kerosene and one part by volume of a mixture of mono and diesters of ortho phosphoric acid of iso octyl alcohol. The contact was maintained for about two minutes in each of the four successive countercurrent stages. The organic solvent was separated from contact with the fresh aqueous phase and processed for recovery of about 0.38 pound uranium fluoride cake (dry basis), containing 0.23 pound $U_3O_8$, by contact with 15% HF solution. Fresh organic was contacted with the aqueous phase, after three prior contacts with partially loaded ($U_3O_8$) organic, and upon separation of the phases the aqueous was then processed to recover values contained in the aqueous phase.

The resulting solution was adjusted to pH 7 with ammonium hydroxide (29%) and evaporated to dryness to recover a material suitable for agricultural consumption.

*Example III*

Dry leached zone material was air sized to produce a 1000 pound fraction of material passing through a 200 mesh standard screen. This leached zone material, having the following chemical analysis:

| Component: | Percent by weight |
|---|---|
| $Al_2O_3$ | 30.4 |
| $P_2O_5$ | 16.8 |
| $U_3O_8$ | 0.026 |
| CaO | 0.5 |
| $Fe_2O_3$ | 1.6 |
| Acid insolubles ($SiO_2$, etc.) | 30.3 | was mixed with 96% sulfuric acid at a rate of about 53 pounds of acid per 100 pounds of dry solids and about 20 pounds of water added per 100 pounds of dry solids, water being added to aid more complete mixing of solid and liquid materials. This amount of acid constituted about 49% acidulation.

The solids and liquids were mixed in a pug mill running at about 120 r.p.m. The heavy paste discharged from the pug mill was roasted at a temperature of approximately 500° C. for one hour.

The roasted material after cooling was leached with water at 65° C. for 30 minutes and filtered to recover solubilized constituents and the insoluble cake discarded. A filter rate of approximately 50 gallons of slurry per square foot of filter area per hour was attained. The resultant extract at approximately 1.3 specific gravity showed the following pounds of constituents recovered per 1000 pounds of minus 200 mesh leached zone feed:

| | |
|---|---|
| $P_2O_5$ | 62 |
| $Al_2O_3$ | 146 |
| $U_3O_8$ | 0.23 |

The mineral digest solution having a volume of about 150 gallons was subjected to contact with about 10 pounds of powdered metallic iron and agitated for about 30 minutes, after which the solids were filtered from the liquid. This liquid was then thoroughly contacted with about 15 gallons of an organic solvent composed of about nine parts by volume of kerosene and one part by volume of a mixture of mono and diesters of ortho phosphoric acid of iso octyl alcohol. The contact was maintained for about two minutes in each of the four successive countercurrent stages. The organic solvent was separated from contact with the fresh aqueous phase and processed for recovery of about 0.36 pound uranium fluoride cake (dry basis), containing 0.22 pound $U_3O_8$, by contact with 15% HF solution. Fresh organic was contacted with the aqueous phase, after three prior contacts with partially loaded ($U_3O_8$) organic, and upon separation of the phases the aqueous phase was processed to recover values contained in the aqueous phase.

The resulting solution was adjusted to pH 7 with ammonium hydroxide (29%) and evaporated to dryness to recover a material suitable for agricultural consumption.

*Example IV*

Dry leached zone material was air sized to produce a 1000 pound fraction of material passing through a 200 mesh standard screen. This leached zone material, having the following chemical analysis:

| Component: | Percent by weight |
|---|---|
| $Al_2O_3$ | 30.4 |
| $P_2O_5$ | 16.8 |
| $U_3O_8$ | 0.026 |
| CaO | 0.5 |
| $Fe_2O_3$ | 1.6 |
| Acid insolubles ($SiO_2$, etc.) | 30.3 | was mixed with 96% sulfuric acid at a rate of about 81 pounds of acid per 100 pounds of dry solids and about 20 pounds of water added per 100 pounds of dry solids. This amount of acid constituted about 75% acidulation.

The solids and liquids were mixed in a pug mill running at about 120 r.p.m. The heavy paste discharged from the pug mill was roasted at a temperature of approximately 300° C. for three hours.

The roasted material after cooling was leached with water at 65° C. for 30 minutes and filtered to recover solubilized constituents and the insoluble cake discarded. A filter rate of approximately 35 gallons of slurry per square foot of filter area per hour was attained. The resultant extract at approximately 1.3 specific gravity showed the following pounds of constituents recovered per 1000 pounds of minus 200 mesh leached zone feed.

| | |
|---|---|
| $P_2O_5$ | 135 |
| $Al_2O_3$ | 250 |
| $U_3O_8$ | 0.230 |

The solids removed in the filtering operation and washing were dried at 110° C. to give 530 pounds of dry cake having the following composition:

| Constituent: | Percent by weight |
|---|---|
| $P_2O_5$ | 6.6 |
| $Al_2O_3$ | 10.1 |
| $U_3O_8$ | 0.006 |
| $SO_4$ | 4.6 |

The mineral digest solution having a volume of about 300 gallons, together with wash liquors from the recrystallization of ammonium alum hereinafter explained, was evaporated to a water content of 70%, cooled to 20° C., and 660 pounds ammonium bisulfate added to precipitate ammonium aluminum sulfate. This reaction mixture was mildly agitated for four hours and filtered. The mother liquor was then processed for uranium recovery and the crude alum further processed. Approximately 2120 pounds of ammonium alum, having the following composition,

| Constituent: | Percent by weight (dry basis) |
|---|---|
| $Al_2O_3$ | 9.98 |
| $P_2O_5$ | 0.181 |
| $Fe_2O_3$ | 0.013 |
| $SiO_2$ | 0.013 |
| $SO_4$ | 39.7 |
| $NH_4$ | 4.33 | were recovered. This crude ammonium alum crystal was recrystallized twice in a countercurrent circuit where water was introduced into the system by washing of the twice recrystallized or purified ammonium alum. Recovered liquor from washing of the purified alum was used in recrystallizing during the second recrystallization, liquor recovered from the second recrystallization used in the first recrystallization and liquor from the first recrystallization was cycled to the evaporation step, where it was combined with the liquor from the filtration, and evaporated to a 70% water content. Impurities in the recrystallized and twice recrystallized alum were,

| Impurity as Parts per Million | Recrystallized Alum | Twice Recrystallized Alum |
|---|---|---|
| $P_2O_5$ | 80 | 3 |
| $Fe_2O_3$ | 30 | 12 |
| $SiO_2$ | 1 | 1 | on a moisture free basis. One hundred pounds of purified alum were mixed with 7.2 gallons of 20% aqueous ammonia in a slowly revolving rotary drum type mixer for two hours and the resulting product filtered. After filtering and a water wash (150 pounds water) of the solids 84 pounds of material analyzing Component: Percent by weight
$Al_2O^3$ _____ 12.8
$SO_4$ _____ 19.5
$NH_3$ _____ 7.28
$H_2O$ (110° C.) _____ 55.3 were recovered. These solids were fired for one hour at 1150° C. to give 11.8 pounds of aluminum of sufficient purity and water sorption properties that it could be used in the electrolytic production of high grade aluminum metal.

Aqueous solution recovered from the separation of the crude ammonium alum was adjusted to a sulfate composition of 220 grams per liter to give about 206 gallons of solution having a specific gravity of 1.30. This solution was subjected to contact with about 10 pounds of powdered metallic iron and agitated for about 30 minutes, after which the solids were filtered from the liquid. This liquid was then thoroughly contacted with about 20 gallons of an organic solvent composed of about nine parts by volume of kerosene and one part by volume of a mixture of mono and diesters of ortho phosphoric acid of iso octyl alcohol. The contact was maintained for about two minutes in each of the four successive countercurrent stages. The organic solvent was separated from contact with the fresh aqueous phase and processed for recovery of about 0.36 pound uranium fluoride cake (dry basis), containing 0.22 pound $U_3O_8$, by contact with 15% HF solution. Fresh organic was contacted with the aqueous phase, after three prior contacts with partially loaded ($U_3O^8$) organic, and upon separation of the phases the aqueous was then processed to recover values contained in the aqueous phase.

The resulting solution heated to 100° F. was adjusted to pH 4.5 in a continuous system with anhydrous ammonia gas, held at this pH for about 30 minutes, filtered on a drum filter to give a filtering rate of 26 gallons per hour per square foot of filtrate, the wet cake washed with an equal volume of water and this cake dried to give a product, suitable for use in agricultural applications, of the following chemical composition:

Component: Percent by weight
$P_2O_5$ (total) _____ 43.8
$P_2O_5$ (citrate soluble) _____ 42.85
$P_2O_5$ (water soluble) _____ 4.15
$Al_2O_3$ _____ 18.35
$NH_3$ _____ 7.22
$Fe_2O_3$ _____ 4.77
F _____ 3.80
CaO _____ 0.74
$SO_4$ _____ 1.28 which on a dry basis gave 207 pounds of product. Solutions from the filtering and washing of the aluminum phosphate fertilizer material were combined and evaporated at atmospheric pressure to give a liquor phase composition of,

50% $NH_4H_2PO_4$
25% $(NH_4)_2SO_4$
25% $H_2O$ then filtered hot, water added to the solution and cooled to 25° C. to crystallize $NH_4H_2PO_4$ and leave a liquor phase composition, in equilibrium with the solid phase at 25° C., of

11% $NH_4H_2PO_4$
37% $(NH_4)_2SO_4$
52% $H_2O$ which was present at a weight ratio of crystallized solids to liquor ratio of 30 to 80. Upon filtering at 25° C. the liquor phase was cycled for mixing with fresh liquor, after removal of the aluminum phosphate fertilizer material, and subsequent further recoveries of the values contained in this portion of the liquor. Approximately 680 pounds of material largely as ammonium sulfate and 100 pounds of material largely as monoammonium phosphate were recovered upon attainment of equilibrium on cycling of the liquor which was recovered upon separation of monoammonium phosphate.

As was illustrated in Tables I and II comparatively high uranium recovery and low phosphorus and aluminum recoveries can be obtained by proper selection of percent acidulation when using heat treating temperatures in the range of about 250° C. to about 350° C. Even higher uranium recoveries per unit of phosphorus and aluminum are possible by increasing the heat treating temperature from about 350° C. to about 700° C. while maintaining 40% acidulation. This has been illustrated in Table III following. In these cases sulfuric acid was added to dry minus 200 mesh leached zone, heated one hour at the temperature indicated, cooled and extracted 30 minutes at 95° C. Percent of original components solubilized are shown for feeds "K," "W" and "M." Feed "W" was determined to be largely wavellite and silica sand, feed "M" was a mixed ore of pseudo-wavellite wavellite, kaolinite and silica sand, and feed "K" was largely kaolin and silica sand. A sample containing largely pseudowavellite and silica sand gave percent solubilization intermediate between feeds "M" and "W" and have been omitted.

TABLE III

| Component Extracted at Temperature, ° C. Indicated | Percent Solubilized from Feed Indicated | | |
|---|---|---|---|
| | "K" | "M" | "W" |
| (A) 100° C.: | | | |
| (1) $U_3O_8$ | 55 | 70 | 82 |
| (2) $P_2O_5$ | | 66 | 62 |
| (3) $Al_2O_3$ | 16 | 48 | 40 |
| (B) 250° C.: | | | |
| (1) $U_3O_8$ | 83 | 49 | 80 |
| (2) $P_2O_5$ | | 36 | 40 |
| (3) $Al_2O_3$ | 38 | 41 | 47 |
| (C) 500° C.: | | | |
| (1) $U_3O_8$ | 93 | 48 | 84 |
| (2) $P_2O_5$ | | 10 | 23 |
| (3) $Al_2O_3$ | 38 | 28 | 40 |
| (D) 700° C.: | | | |
| (1) $U_3O_8$ | 83 | 46 | 77 |
| (2) $P_2O_5$ | | 2 | 8 |
| (3) $Al_2O_3$ | 36 | 10 | 20 |
| (E) 800° C.: | | | |
| (1) $U_3O_8$ | Less than 5% of all components. | | |
| (2) $P_2O_5$ | | | |
| (3) $Al_2O_3$ | | | |

The decrease of values above about 700° C. is attributed to the loss of sulfur in the heating operation.

Having thus described our invention what we claim is:
1. In a method of recovering mineral values from low grade phosphate ore, the steps which comprise acidulating the ore with sulfuric acid under conditions of strong agitation to form a pasty slurry, heat treating the acid mix at temperatures in the range between about 250° C. and about 700° C. while drying the acid mix to produce dry solids therefrom, and leaching the water soluble reaction products from said dry solids, whereby a leach solution is obtained containing phosphorus, aluminum and uranium values.

2. In a method of recovering mineral values from leached zone material, the steps which comprise classifying the ore to recover a minus 200 mesh fraction, acidulating the leached zone fraction with sulfuric acid under conditions of strong agitation to form a pasty slurry, heat treating the acid mix at temperatures in the range between about 250° C. and about 700° C. while drying the acid mix to produce dry solids therefrom, and leaching the water soluble reaction products from said dry solids, whereby a leach solution is obtained containing phosphorus, aluminum and uranium values.

3. A method of recovering mineral values from leached zone material which comprises classifying the ore to recover a minus 200 mesh fraction, acidulating the fraction with sulfuric acid under conditions of strong agitation to form a pasty slurry, said sulfuric acid being added in an amount to produce between about 10% and about 90% acidulation, heat treating the acid mix at temperatures in the range between about 250° C. and about 700° C. while drying the acid mix to produce dry solids therefrom, leaching the water soluble reaction products from said dry solids and recovering from the leached solution at least one constituent selected from the group of phosphorus, aluminum and uranium.

4. A method of recovering mineral values from leached zone material which comprises classifying the ore to recover a minus 200 mesh fraction, acidulating the fraction with sulfuric acid under conditions of strong agitation to form a pasty slurry, said sulfuric acid being added in an amount to produce between about 60% and about 90% acidulation, heat treating the acid mix at temperatures in the range between about 250° C. and about 700° C. while drying the acid mix to produce dry solids therefrom, leaching the water soluble reaction products from said dry solids and recovering from the leached solution at least one constituent selected from the group of phosphorus, aluminum and uranium.

5. A method of recovering mineral values from leached zone material which comprises classifying the ore to recover a minus 200 mesh fraction, acidulating the leached zone fraction with sulfuric acid under conditions of strong agitation to form a pasty slurry, heat treating the acid mix at temperatures in the range between about 250° C. and about 700° C. while drying the acid mix to produce dry solids therefrom, for a period between about one-half hour and about six hours, leaching the water soluble reaction products from said dry solids and recovering from the leached solution at least one constituent selected from the group of phosphorus, aluminum and uranium.

6. A method of recovering mineral values from leached zone material which comprises classifying the ore to recover a minus 200 mesh fraction, acidulating the leached zone fraction with sulfuric acid under conditions of strong agitation to form a pasty slurry, heat treating the acid mix at temperatures in the range between about 250° C. and about 700° C. while drying the acid mix to produce dry solids therefrom, for a period between about one and about three hours, leaching the water soluble reaction products from said dry solids and recovering from the leached solution at least one constituent selected from the group of phosphorus, aluminum and uranium.

7. A method of recovering mineral values from leached zone material which comprises classifying the ore to recover a minus 200 mesh fraction, acidulating the ore with sulfuric acid under conditions of strong agitation to form a pasty slurry, aging the acid mix for a period of about fourteen to about thirty days, heat treating the acid mix at temperatures in the range between about 250° C. and about 700° C. while drying the acid mix to produce dry solids therefrom, leaching the water soluble reaction products from said dry solids and recovering from the leached solution at least one constituent selected from the group of phosphorus, aluminum and uranium.

8. A method of recovering mineral values from leached zone material which comprises classifying the ore to recover a minus 200 mesh fraction, acidulating the leached zone fraction with sulfuric acid under conditions of strong agitation to form a pasty slurry, heat treating the acid mix at temperatures in the range between about 250° C. and about 700° C. while drying the acid mix to produce dry solids therefrom, leaching the water soluble reaction products from said dry solids, separating the solution of reaction products from insoluble material, reacting the solution with sulfates of ammonia to precipitate alum, separating the ammonium alum precipitate and recovering from the resultant solution at least one constituent selected from the group of phosphorus and uranium.

9. A method of recovering mineral values from leached zone material which comprises classifying the ore to recover a minus 200 mesh fraction, acidulating the leached zone fraction with sulfuric acid under conditions of strong agitation to form a pasty slurry, heat treating the acid mix at temperatures in the range between about 250° C. and about 450° C. while drying the acid mix to produce dry solids therefrom, leaching the water soluble reaction products from said dry solids, separating leached solution from insoluble material, reacting the leached solution with sulfate of ammonia to precipitate ammonium alum effecting at least a partial reduction of the uranium present in the resultant aqueous liquor to the quadrivalent stage, contacting the reduced solution with an organic solvent containing a phosphoric acid ester of an alkyl monohydric alcohol, separating the organic phase from the aqueous phase, treating the organic phase with sufficient aqueous HF to precipitate uranium tetrafluoride and segregating the $UF_4$ precipitate.

10. A method of recovering mineral values from leached zone material which comprises classifying the ore to recover a minus 200 mesh fraction, acidulating the leached zone fraction with sulfuric acid under conditions of strong agitation to form a pasty slurry, heat treating the acid mix at temperatures in the range between about 250° C. and about 450° C. while drying the acid mix to produce dry solids therefrom, leaching the water soluble reaction products from said dry solids, separating leached solution from insoluble material, reacting the leached solution with sulfate of ammonia to precipitate ammonium alum, effecting at least a partial reduction of the uranium present in the resultant aqueous liquor to the quadrivalent stage, contacting the reduced solution with an organic solvent containing a phosphoric acid ester of an alkyl monohydric alcohol, separating the organic phase from the aqueous solution phase, treating the organic phase with sufficient aqueous HF to precipitate uranium tetrafluoride, segregating the $UF_4$ precipitate and ammoniating the recovered aqueous solution phase.

11. A method of recovering mineral values from leached zone material which comprises classifying the ore to recover a minus 200 mesh fraction, acidulating the leached zone fraction with sulfuric acid under conditions of strong agitation to form a pasty slurry, heat treating the acid mix at temperatures in the range between about 250° C. and about 700° C. while drying the acid mix to produce dry solids therefrom, leaching the water soluble reaction products from said dry solids, separating leached solution from insoluble material, reacting the leached solution with sulfate of ammonia to precipitate ammonium alum, effecting at least a partial reduction of the uranium present in the resultant aqueous liquor to the quadrivalent stage, contacting the reduced solution with an organic solvent containing a phosphoric acid ester of an alkyl monohydric alcohol, separating the organic phase from the aqueous phase, treating the organic phase with sufficient aqueous HF to precipitate uranium tetrafluoride, segregating the $UF_4$ precipitate, adjusting the pH of the aqueous solution phase to about 7 to 10 with an ammonium reactant, separating iron and aluminum phosphates, further ammoniating the solution and recovering phosphate as the ammonium salt.

12. A method of recovering mineral values from leached zone material which comprises classifying the ore to recover a minus 200 mesh fraction, adding to the leached zone fraction 96% sulfuric acid in a quantity of about 53 pounds of acid per 100 pounds of dry solids, adding about 20 pounds of water to the acidified mix and agitating the mix in a pug mill to form a heavy paste, heat treating the mix at a temperature of approximately 300° C. for three hours while drying the mix to produce dry solids therefrom, leaching said dry solids with water to produce an extract of approximately 1.3 specific gravity, contacting the extract with powdered metallic iron for about 30 minutes to reduce uranium to the tetravalent state, separating the iron solids, contacting the reduced extract with a kerosene extender mixture of mono and diesters of ortho phosphoric acid, separating the aqueous solution and organic ester phases, mixing the organic ester phase with 15% hydrofluoric acid to precipitate uranium tetrafluoride, separating and drying the $UF_4$, adjusting the pH of the aqueous phase to about 7 with ammonium hydroxide and evaporating the neutralized material to dryness.

13. A method of recovering mineral values from leached zone material which comprises classifying the ore to recover a minus 200 mesh fraction, adding to the leached zone fraction 96% sulfuric acid at a rate of about 53 pounds of acid per 100 pounds of dry solids, adding about 20 pounds of water to the mix and agitating the mix in a pug mill to form a heavy paste, heat treating the mix at a temperature of approximately 500° C. for one hour while drying the mix to produce dry solids therefrom, leaching said dry solids with water to produce an extract of approximately 1.3 specific gravity, contacting the extract with powdered metallic iron for about 30 minutes to reduce uranium to the tetravalent state, separating the iron solids, contacting the reduced extract with a kerosene extender mixture of mono and diesters of ortho phosphoric acid, separating the aqueous solution and organic ester phases, mixing the organic ester phase with 15% hydrofluoric acid to precipitate uranium tetrafluoride, separating and drying the $UF_4$, adjusting the pH of the aqueous phase to about 7 with ammonium hydroxide and evaporating the neutralized material to dryness.

References Cited in the file of this patent

UNITED STATES PATENTS

| | | |
|---|---|---|
| 1,098,282 | McCoy | May 26, 1914 |
| 2,769,686 | McCullough et al. | Nov. 6, 1956 |
| 2,819,145 | McCullough et al. | Jan. 7, 1958 |

OTHER REFERENCES

RMO-2030, AEC Document, Sept. 13, 1954.
RMO-2032, AEC Document, Sept. 13, 1954, pp. 6, 19, 22.
RMO-2041, AEC Document, Feb. 28, 1955, pp. 6, 7.